BLINK COMPENSATING APPARATUS AND METHOD FOR OBJECTIVE REFRACTOR FOR THE EYE
Original Filed April 23, 1973
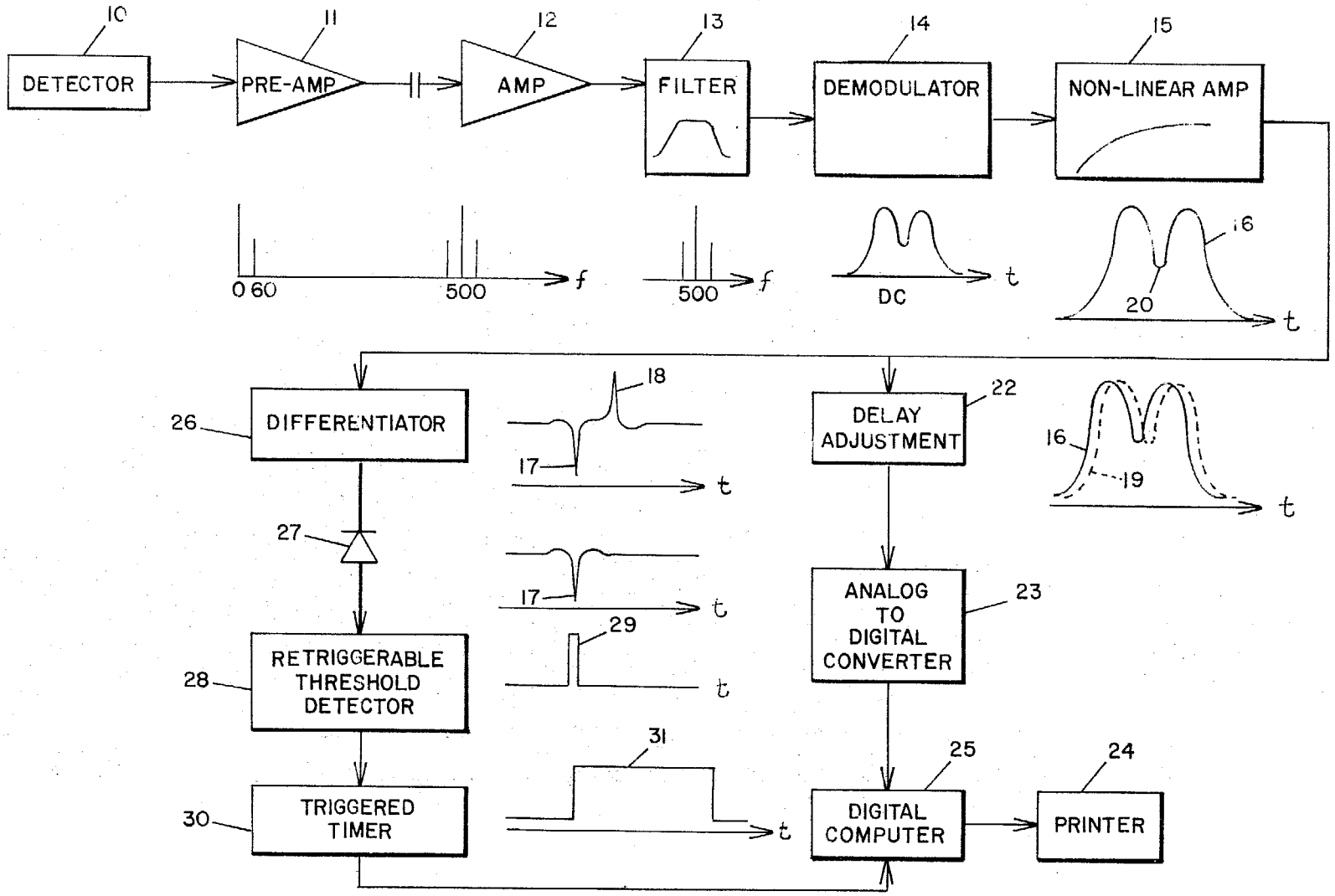

United States Patent

Re. 28,415
Reissued May 6, 1975

28,415

BLINK COMPENSATING APPARATUS AND METHOD FOR OBJECTIVE REFRACTOR FOR THE EYE

Bruce R. Robinson, Penfield, Charles R. Munnerlyn and Terrance N. Clapham, Fairport, and James W. Horwitz, Rochester, N.Y., assignors to Tropel, Inc., Fairport, N.Y.

Original No. 3,802,768, dated Apr. 9, 1974, Ser. No. 353,649, Apr. 23, 1973. Application for reissue June 10, 1974, Ser. No. 478,062

Int. Cl. A61b *3/10;* G01j *5/28*

U.S. Cl. 351—6 19 Claims

Matter enclosed in heavy brackets [ ] appears in the original patent but forms no part of this reissue specification; matter printed in italics indicates the additions made by reissue.

ABSTRACT OF THE DISCLOSURE

The inventive method compensates for blinks occurring during examination of the eye by an objective refractor. An analog signal is produced as a function of the focus of a light pattern reflected from the eye, and the signal is processed and fed to an analyzer for determining the refractive error of the eye. The input to the analyzer is delayed to follow the analog signal by a predetermined delay. Meanwhile, any rate of change of the analog signal exceeding a predetermined threshold is detected to represent the beginning of a blink, and a blink commencement signal is produced and used to stop the examination of the eye for a predetermined blink interval exceeding the expected duration of the blink. Also, the analyzer ignores the portion of the analyzer input devoted to the blink interval.

THE INVENTIVE IMPROVEMENT

Objective refractors for the eye have encountered many difficulties in producing a usable signal and determining refractive error through use of the signal. One of the problems is that an eye blink often occurs during examination of the eye, and the reflected light from the eye is distorted during the blink when the eyelashes and eyelid move over the cornea. The invention involves a recognition of this problem and a method for compensating for an eye blink occurring during examination of the eye by an objective refractor. The invention seeks reliability, accuracy, speed, efficiency, and practicality in compensating for an eye blink.

SUMMARY OF THE INVENTION

The inventive method compensates for eye blinks occurring during examination of the eye by an objective refractor. An analog signal is produced as a function of the focus of a light pattern reflected from the eye, and the signal is processed and fed to an analyzer for determining the refractive error of the eye. The input to the analyzer is delayed to follow the analog signal by a predetermined delay. Any rate of change of the analog signal exceeding a predetermined threshold is detected to represent the beginning of a blink, and a blink commencement signal is produced upon detection of a blink. The blink commencement signal is used to stop examination of the eye for a predetermined blink interval slightly exceeding the expected duration of the blink, and the portion of the analyzer input devoted to the blink interval is ignored. The eye examination and analyzer evaluation resumes after the blink interval and continues until another blink occurs.

DRAWINGS

The drawing is a schematic view of a preferred embodiment of the inventive blink compensator.

DETAILED DESCRIPTION

The invention applies to an objective refractor for measuring the refractive error of any eye, and any such refractor may include an optical system for directing a light pattern on the eye and monitoring the light pattern reflected from the retina of the eye. The light is preferably chopped to impose a frequency on the reflected light, and the focus variation of the reflected pattern varies the intensity of the monitored light to produce an analog signal as a function of the focus of the light pattern reflected from the eye. This analog signal is the output of a detector 10 such as a photomultiplier tube or other light responsive device.

The signal from detector 10 is applied to a preamplifier 11 capacitively coupled to an amplifier 12, and at the amplifier stage the signal includes a DC component from ambient light, a 60 Hz component, and a usable signal at a preselected frequency such as 500 Hz with sidebands for Doppler effect from movement of optical system elements. This signal is fed to a filter 13 that passes 500 Hz ±50 Hz to select all the usable signal and eliminate unwanted components. This is rectified in a demodulator 14 and amplified by a non-linear amplifier 15 serving as an automatic gain control. The result is a DC analog signal 16 as a function of the focus of the light pattern reflected from the eye, and for purposes of illustration, signal 16 contains a blink signal 20.

Signal 16 is processed and fed to an analyzer for determining the refractive error of the eye, and the analyzer can be an analog device such as servo-mechanism, a plotting device, or other analog mechanism, but the preferred analyzer as shown in the drawing is digital computer 25. Computer 25 operates the optical system of the refractor to make adjustments necessary in examining the eye, and when the examination is completed, computer 25 calculates the refractive error, and signals printer 24 to print out the error in standard form.

The processing of analog signal 16 for input to computer 25 includes an analog-to-digital converter 23 and a delay adjustment circuit 22. Circuit 22 has an output 19 that is adjusted in amplitude and delayed by a few milliseconds behind input signal 16. This means that computer 25 receives digital information a few milliseconds after detector 10 receives the information in analog form.

Meanwhile, signal 16 is also applied to differentiator 26 which responds to the rate of change of signal 16 to produce a spike 17 at the beginning of a blink and another spike 18 at the end of a blink. Diode 27 passes only the initial spike 17 representing the beginning of a blink, and a retriggerable threshold detector 28 produces an output pulse 29 whenever spike 17 has sufficient amplitude to represent the beginning of a blink. Pulse 29 triggers timer 30 to produce a blink interval pulse 31 of a predetermined length such as 400 milliseconds to slightly exceed the expected length of a blink. Pulse 31 is fed instantly to computer 25 which stops the examination of the eye for a blink delay as previously described. Delay circuit 22 ensures that the blink interval pulse 31 reaches computer 25 before any blink distortion in the data from converter 23. Computer 25 then ignores the data from converter 23 until expiration of blink interval pulse 31 and then resumes the examination.

Computer 25 is readily programmed to react as described to blink interval pulse 31. In effect, the eye examination stops, and incorrect data coming from converter 23 is not accepted until after the end of blink interval pulse 31 when examination resumes and data is again accepted by computer 25.

Pulse 29 could be fed directly to computer 25 and a blink interval timer could be arranged in computer 25 if desired. The delay produced by circuit 22 is preferably only the few milliseconds necessary to allow computer 25 to react to pulse 31 before data arrives from converter 23. Pulses 29 or 31 can also be applied in various ways to analog analyzers to the same general effect. The analyzer or any other means for moving elements in the optical system is stopped for a blink interval, and incoming data is ignored until the interval expires. Also, various circuitry and components other than the elements of the illustrated preferred embodiment can be arranged to accomplish the inventive method.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand the application of the inventive method to various objective refractors.

I claim:

1. A method of compensating for a blink occurring during examination of the eye by an objective refractor, said method comprising:

a. producing an analog signal as a function of the focus of light pattern reflected from said eye;

b. processing said analog signal and feeding the result as an input to an analyzer for determing the refractive error of said eye;

c. delaying said input to said analyzer to follow said analog by a predetermined delay;

d. detecting a rate of change of said analog signal exceeding a predetermined threshold and representing the beginning of a blink;

e. producing a blink commencement signal upon detection of said blink;

f. using said blink commencement signal to stop said examination of said eye for a predetermined blink interval exceeding the expected duration of said blink; and g. ignoring the portion of said analyzer input devoted to said blink interval.

2. The method of claim 1 including using said blink commencement signal to trigger a pulse having a duration equal to said blink interval, and feeding said blink interval pulse to said analyzer for stopping said examination and ignoring said input.

3. The method of claim 1 including using a digital computer for said analyzer, and converting said analog signal to digital input during said signal processing.

4. The method of claim 3 including programming said computer to control said examination.

5. The method of claim 1 including using a differentiator and a threshold detector for detecting said beginning of a blink.

6. The method of claim 5 including using said blink commencement signal to trigger a pulse having a duration equal to said blink interval, and feeding said blink interval pulse to said analyzer for stopping said examination and ignoring said input.

7. The method of claim 6 including using a triggered timer to produce said blink interval pulse.

8. The method of claim 7 including using a digital computer for said analyzer, and converting said analog signal to digital input during said signal processing.

9. The method of claim 8 including programming said computer to control said examination.

*10. A method of compensating for a blink occurring during examination of an eye by an automatic instrument directing radiant energy into said eye, said method comprising:*

*(a) producing a signal as a function of radiant energy reflected from said eye;*

*(b) detecting a rate of change of said signal exceeding a predetermined threshold and representing the beginning of a blink;*

*(c) producing a blink commencement signal upon detection of said blink; and*

*(d) using said blink commencement signal to stop said examination of said eye during said blink.*

*11. The method of claim 10 including using said blink commencement signal to trigger a pulse having a predetermined duration exceeding the expected duration of said blink, and stopping said examination of said eye during said pulse.*

*12. The method of claim 10 including using a digital computer to control said examination, and feeding said blink commencement signal to said computer to stop said examination.*

*13. The method of claim 12 including using said blink commencement signal to trigger a pulse having a predetermined duration exceeding the expected duration of said blink, and stopping said examination of said eye during said pulse.*

*14. In an instrument for automatically examining an eye by directing radiant energy into said eye, a blink compensating system comprising:*

*(a) means for producing a signal as a function of radiant energy reflected from said eye;*

*(b) means for detecting a rate of change of said signal exceeding a predetermined threshold and representing the beginning of a blink;*

*(c) means for producing a blink commencement signal upon detection of said blink; and*

*(d) means responsive to said blink commencement signal for stopping said examination of said eye.*

*15. The system of claim 14 including means responsive to said blink commencement signal for triggering a pulse having a predetermined duration exceeding the expected duration of said blink, and said examination stopping means being operable during said pulse.*

*16. The system of claim 14 including a digital computer programmed for controlling said examination, and means for feeding said blink commencement signal to said computer for stopping said examination.*

*17. The system of claim 16 including means responsive to said blink commencement signal for triggering a pulse having a predetermined duration exceeding the expected duration of said blink, and said examination stopping means being operable during said pulse.*

*18. The system of claim 17 including a differentiator and a threshold detector arranged for detecting said beginning of said blink.*

*19. The system of claim 18 including a triggered timer arranged for producing said pulse.*

References Cited

The following references, cited by the Examiner, are of record in the patented file of this patent or the original patent.

UNITED STATES PATENTS 2,996,624 8/1961 Mumma ---------- 250—206 X

PAUL A. SACHER, Primary Examiner

U.S. CL. X.R.

250—206; 351—39